United States Patent [19]

Mizumoto et al.

[11] Patent Number: 4,708,350
[45] Date of Patent: Nov. 24, 1987

[54] MAGNETIC LIQUID SEAL WITH MAGNETIZED DEFORMABLE MAGNET

[75] Inventors: Muneo Mizumoto, Tsuchiura; Hiroshi Inouye, Ibaraki; Hiroyuki Kitsunai, Tsuchiura, all of Japan

[73] Assignee: Hitachi, Ltd., Tokyo, Japan

[21] Appl. No.: 886,813

[22] Filed: Jul. 18, 1986

[30] Foreign Application Priority Data

Jul. 24, 1985 [JP]  Japan ................................ 60-161818
May 2, 1986 [JP]  Japan ................................ 61-100945

[51] Int. Cl.⁴ .......................... F16J 15/16; F16J 15/40
[52] U.S. Cl. ........................................ 277/80; 277/135
[58] Field of Search ................ 277/1, 80, 135, 228; 310/90.5

[56] References Cited

U.S. PATENT DOCUMENTS 2,855,639  10/1958  Korb ................................ 277/80 X
4,526,382  7/1985  Raj et al. ............................ 277/80

FOREIGN PATENT DOCUMENTS 612801   1/1961  Canada ................................ 277/80
56-20831  2/1981  Japan ................................ 277/80
59-97368  6/1984  Japan ................................ 277/80
60-40871  3/1985  Japan ................................ 277/80
815382   3/1981  U.S.S.R. ............................ 277/80
823720   4/1981  U.S.S.R. ............................ 277/80

Primary Examiner—Robert S. Ward
Attorney, Agent, or Firm—Antonelli, Terry & Wands

[57] ABSTRACT

A magnetic liquid seal retains a magnetic liquid by means of the magnetic force applied thereto from a magnet. The magnet is constituted by a magnetized deformable member.

18 Claims, 19 Drawing Figures

MAGNETIC LIQUID SEAL WITH MAGNETIZED DEFORMABLE MAGNET

BACKGROUND OF THE INVENTION

The present invention relates to a magnetic liquid seal which seals a gap defined between two members by means of a magnetic liquid.

Magnetic liquid seals are generally employed to seal rotating shafts. A typical conventional magnetic liquid seal has as shown in the specification of U.S. Pat. No. 4,357,021, a permanent magnet and two pieces of magnetic pole which are respectively provided on both sides thereof for applying a magnetic entrapped force to a magnetic liquid in the gap defined at a rotating shaft. The permanent magnet and the two pieces of magnetic pole are made of a metal.

The above-described prior art, which has a metallic permanent magnet and metallic pieces of magnetic pole, has the problem that, when these members are mounted on a non-magnetic member, it is necessary to process the metallic members so that they have a relatively high degree of machining accuracy, which means that it has heretofore been difficult to assemble them together at high efficiency.

SUMMARY OF THE INVENTION

It is an object of the present invention to provide a magnetic liquid seal which can be assembled at high efficiency.

It is another object of the present invention to provide a magnetic liquid seal which can be assembled without the need for severe machining accuracy control.

It is still another object of the present invention to provide a magnetic liquid seal which is suitable for suppressing the generation of contaminative particles from a device installed in an environment which is required to have a high degree of cleanness.

To these ends, the present invention provides a magnetic liquid seal in which a magnet for applying a magnetic force to a magnetic liquid is constituted by a magnetized deformable member.

Since the magnet is a deformable member, the magnetic liquid seal can readily be assembled by virtue of the deformation of the magnet. In addition, the deformable magnet cooperates with a magnetic liquid to improve the sealing performance.

The above and other objects, features and advantages of the present invention will become clear from the following description of the preferred embodiments thereof, taken in conjuction with the accompanying drawings.

DETAILED DESCRIPTION OF THE PREFERRED EMBODIMENTS

Preferred embodiments of the present invention will be described hereinunder with reference to the accompanying drawings.

Figure 1:
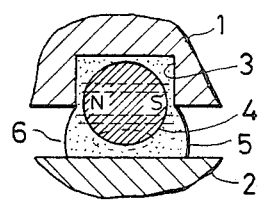
FIG. 1 is a vertical sectional view of one embodiment of the magnetic liquid seal according to the present invention.
Figure 2:
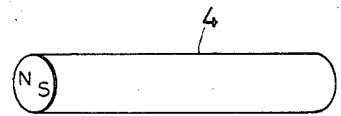
FIG. 2 is a perspective view of one example of a flexible magnet employed in the embodiment shown in FIG. 1.

Referring first to FIG. 1 which shows one embodiment of the magnetic liquid seal according to the present invention, the reference numeral 1 denotes a first member, while the numeral 2 denotes a second member, and the numeral 3 denotes a groove provided in the first member 1 so as to extend in a direction perpendicular to the plane along which the member 1 is sectioned. A deformable magnet 4 has a rod-like configuration and is fitted into the groove 3. This deformable magnet 4 is formed by mixing a magnetic powder into a deformable member made of, for example, a plastic or rubber material, and magnetized by a magnetizing means such as an electromagnet in such a manner that an imaginary line which intersects both the N- and S-poles extends in a direction parallel to the second member 2 as shown in FIG. 2. As a result, magnetic flux is formed so as to extend as shown by the chain lines in FIG. 1. A magnetic liquid 5 is interposed in a gap 6 defined between the deformable magnet 4 and the second member 2.

By virtue of the above-described arrangement, the magnetic flux produced by the deformable magnet 4 extends in such a manner that, when the second member 2 is made of a non-magnetic material, the magnetic flux extends from the N-pole to the S-pole through the gap 6, whereas, when the second member 2 is made of a magnetic material, the magnetic flux is liable to extend from the N-pole to the S-pole through the second member 2, and the magnetic liquid 5 in the gap 6 is entrapped by the magnetic field. As a result, the gap 6 can be sealed.

According to this embodiment, it is possible to seal the gap 6 effectively and, in addition, since the deformable magnet 4 is only required to be fitted into the groove 3 provided in the first member 1, the magnetic liquid seal can readily and efficiently be assembled. Although the area to be sealed in this embodiment is linear, it is possible, according to the present invention, to effectively seal even an area having any curve.

Figure 3:
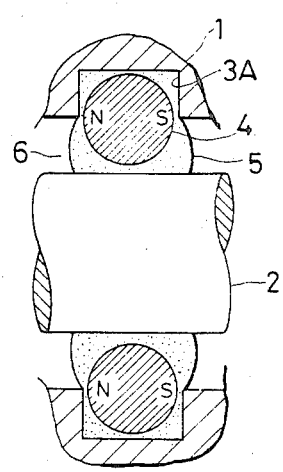
FIG. 3 is a vertical sectional view of another embodiment of the magnetic liquid seal according to the present invention.
Figure 4:
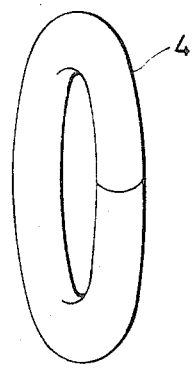
FIG. 4 is a perspective view of one example of a flexible magnet employed in the embodiment shown in FIG. 3.

FIG. 3 shows another embodiment of the magnetic liquid seal according to the present invention. The same reference numerals in this figure as those shown in FIG. 1 respectively denote the same or corresponding members or portions. This embodiment is arranged so as to seal the gap 6 between a first member 1 and a second member 2 which extends through the inside of the first member 1 and which is rotatable. For this purpose, an annular groove 3A is provided in the inner surface of the first member 1, and a deformable magnet 4 is fitted into the groove 3A, the magnet 4 being formed by splicing the end faces of a rod-shaped deformable magnet 4 so as to define an annular ring as shown in FIG. 4, whereby a magnetic liquid 5 is entrapped by magnetic force in the gap 6 between the deformable magnet 4 and the second member 2. The magnet 4 is magnetized in such a manner that the direction in which it is magnetized is parallel to the axis of the second member 2.

It is possible, according to this embodiment, to seal the annular gap 6 by means of the magnetic liquid 5 in a manner similar to that in the first embodiment shown in FIG. 1. In addition, this embodiment can be employed even in the case where the seal line is inclined at any angle with respect to the axis of rotation of the second member 2. Further, it is possible to effect sealing in an annular ring-shaped plane perpendicular to a second member 2 which is a rotating disk-shaped member.

It should be noted that, although the rod-shaped deformable magnet 4 is employed in the embodiment shown in FIG. 3, it is a matter of course that an annular ring-shaped deformable magnet may be employed in place of the magnet 4. It is also possible to employ a magnet which has a rectangular cross-section. In such case, it is preferable to secure the magnet in the groove 3A in such a manner that the longitudinal direction of the magnet is perpendicular to the axis thereof, and the direction in which the magnet is polarized is perpendicular to the axis of the second member 2.

Figure 5:
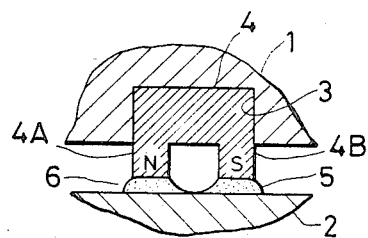
FIGS. 5 to 11 are vertical sectional views respectively showing other embodiments of the magnetic liquid seal according to the present invention.

FIG. 5 shows still another embodiment of the magnetic liquid seal according to the present invention. The same reference numerals in this figure as those shown in FIG. 1 respectively denote the same or corresponding portions or members. In this embodiment, the deformable magnet 4 is provided with two protuberances 4A and 4B which are magnetized so that their distal ends serve as N- and S-poles, respectively, and this deformable magnet 4 is fitted into the groove 3 provided in the first member 1 in such a manner that the respective distal ends of the protuberances 4A and 4B oppose the second member 2 across a gap 6.

With this arrangement, when the second member 2 is made of a non-magnetic material, the magnetic flux produced by the deformable magnet 4 extends from the N-pole to the S-pole through the gap 6, whereas, when the second member 2 is made of a magnetic material, the magnetic flux extends from the N-pole to the S-pole through the second member 2, and the magnetic liquid 5 in the gap 6 is entrapped by the magnetic field. As a result, the gap 6 can be sealed by means of the magnetic liquid 5.

According to this embodiment, advantages similar to those offered by the above-described embodiments can be obtained and, in addition, since two seal areas can be formed, it is possible to further improve the sealing performance.

Figure 6:
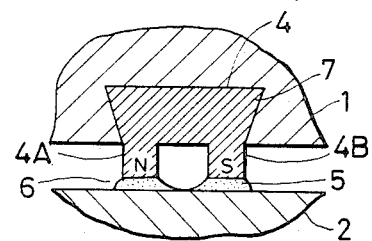

FIG. 6 shows a further embodiment of the magnetic liquid seal according to the present invention. In this embodiment, an engagement portion 7 is provided on the deformable magnet 4 in order to make reliable the insertion of the magnet 4 into the first member 1. This engagement portion 7 may also be applied to the embodiments described above and those described below.

Figure 7:
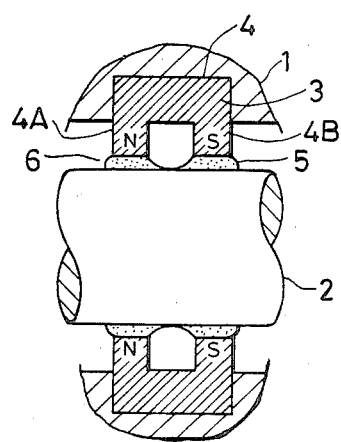

FIG. 7 shows a still further embodiment of the magnetic liquid seal according to the present invention. The same refererence numerals in this figure as those shown in FIG. 1 respectively denote the same or corresponding portions or members. This embodiment is arranged such that the deformable magnet 4 having two protuberances 4A and 4B is fitted into the annular groove 3A provided in the first member 1 in order to seal the gap 6 defined between the first member 1 and the second member 2 which extends through the inside of the first member 1 and which is rotatable, in a manner similar to that in the above-described embodiment shown in FIG. 3.

By virtue of this arrangement, the annular gap 6 can be sealed by means of the magnetic liquid 5 in a manner similar to that in the above-described embodiments. In addition, it is possible to effect excellent sealing for a seal area which has any annular curve, and the magnetic liquid seal can readily be assembled.

Figure 8:
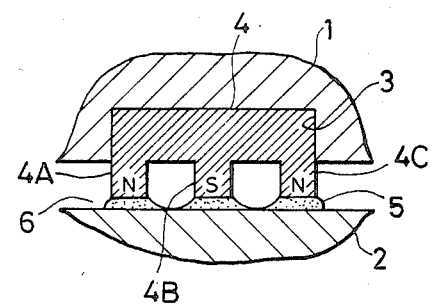

FIG. 8 shows a still further embodiment of the magnetic liquid seal according to the present invention. The same reference numerals in this figure as those shown in FIG. 1 respectively denote the same or corresponding portions or members. In this embodiment, the deformable magnet 4 is provided with three protuberances 4A, 4B and 4C which are so magnetized that the distal end of the central protuberance 4B serves as an S-pole and the respective distal ends of the protuberances 4A and 4C serve as N-poles, and this deformable magnet 4 is fitted into the groove 3 provided in the first member 1 in such a manner that the respective distal ends of the protuberances 4A, 4B and 4C oppose the second member 2 across a gap 6.

It is possible, with this arrangement, to obtain advantages similar to those offered by the above-described embodiments and, further, since three seal areas can be formed, it is possible to to further improve the sealing performance.

It should be noted that, in this embodiment also, it is possible to effect sealing of a seal area having any curve around a rotating second member or an end face portion of such member.

Figure 9:
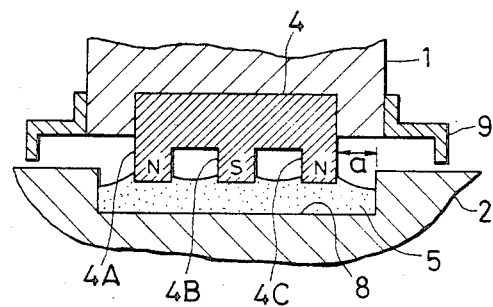

FIG. 9 shows a still further embodiment of the magnetic liquid seal according to the present invention. The same reference numerals in this figure as those shown in FIG. 8 respectively denote the same or corresponding portions or members. This embodiment features a reservoir 8 for the magnetic liquid 5 formed in a portion of the second member 2 which faces the deformable magnet 4. The reference numeral 9 denotes a cover.

According to this embodiment, it is possible not only to obtain advantages similar to those offered by the above-described embodiments but also to retain the magnetic liquid 5 for a long period of time as well as prevent any foreign matter from mixing into the magnetic liquid 5. In addition, if the dimension a between the protuberance 4A or 4C and the peripheral edge of the reservoir 8 is set such as to be sufficiently large, it is possible to obtain stable sealing performance in response to any relative parallel movement between the first and second members 1, 2. This arrangement may also be applied to the embodiments described above and those described below.

Figure 10:
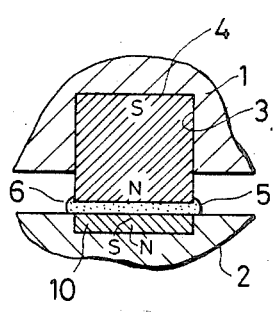

FIG. 10 shows a still further embodiment of the magnetic liquid seal according to the present invention. The same reference numerals in this figure as those shown in FIG. 1 respectively denote the same or corresponding portions or members. This embodiment is designed so as to be applicable to an arrangement in which the second member 2 is made of a non-magnetic material. For this purpose, a magnet plate 10 is attached to the second member 2, and the deformable magnet 4 is magnetized so as to be opposite in magnetic polarity to the magnet plate 10 and fitted into the groove 3 provided in the first member 1.

With this arrangement, it is possible to obtain advantages similar to those offered by the above-described embodiments and, in addition, since the seal width of an area to be sealed can be enlarged, it is possible to increase the sealing performance.

Figure 11:
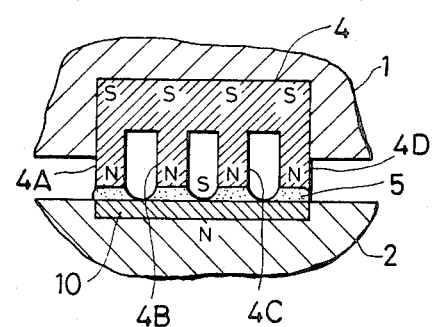

It should be noted that a plurality of protuberances 4A to 4D may be formed on the deformable magnet 4 as shown in FIG. 11 and magnetized in the manner shown in FIG. 10.

It is also possible, according to the embodiments respectively shown in FIGS. 10 and 11, to effect sealing of a seal area having any curve which is located around the second member 2 which is a rotating member or at an end face of such rotating member.

The above-described magnetic liquid seals according to the present invention may be applied to sealing of, for example, the gap defined between the lower surface of a stretchable or foldable curtain and the floor surface which opposes said lower surface, an area having a complicated seal line, an area which needs a simple seal, or a structure in the cosmic space.

FIGS. 12 to 19 respectively show still further embodiments of the magnetic liquid seals shown in FIGS. 1 and 3.

Figure 12:
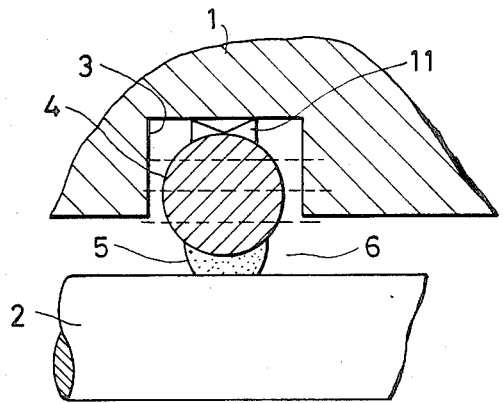
FIGS. 12 to 19 are vertical sectional views respectively showing other embodiments of the magnetic liquid seals according to the present invention which are respectively illustrated in FIGS. 1 and 3.

The embodiment shown in FIG. 12 has a supplementary seal 11 which is provided between the magnet 4 and the groove 3 formed in the first member 1.

This arrangement enables an improvement in the assembling efficiency of the magnet 4 and allows the sealing performance to be further enhanced.

Figure 13:
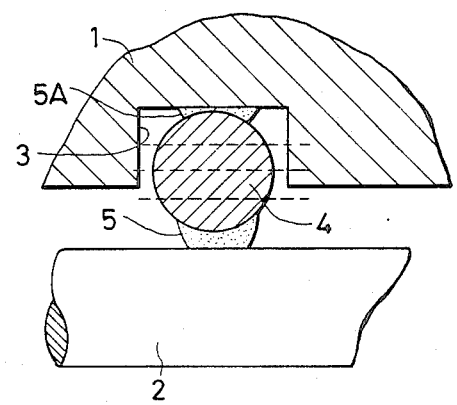

The embodiment shown in FIG. 13 employs as a supplementary seal a magnetic liquid 5A which is interposed between the magnet 4 and the annular groove 3 provided in the first member 1 in a manner similar to that in the case of the gap between the magnet 4 and the second member 2 which is a rotating shaft, so as to seal the narrow gap by utilizing the force caused by the effect of magnetic attraction which is exerted on the magnetic liquid 5A by the magnet 4.

According to this embodiment, it is unnecessary to particularly modify the structure in order to provide a supplementary seal, and it is possible to realize a magnetic liquid seal which has a simple structure and is capable of completely sealing contaminative particles. Thus, fine contaminative particles can be completely sealed.

Figure 14:
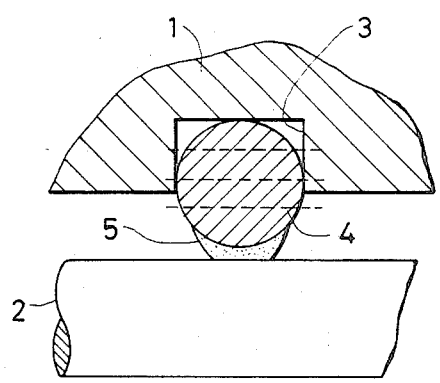

FIG. 14 shows a still further embodiment of the magnetic liquid seal according to the present invention. In this embodiment, as a magnet 4 an elastic rubber magnet or the like is employed so as to also serve as a sepplementary seal which seals the narrow gap between the magnet 4 and the first member 1, the elastic rubber magnet 4 being press-fitted into the groove 3 provided in the first member 1 in such a manner that the magnet 4 seals the narrow gap defined between the same and the inner surface of the groove 3.

It is possible, according to this embodiment, to secure the magnet 4 stably and realize a complete sealing type magnetic liquid seal with a simplified structure.

Figure 15:
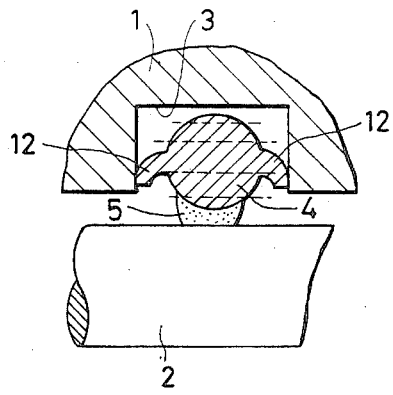

The embodiment shown in FIG. 15 is arranged such that one or more elastically deformable projections 12 are provided on the magnet 4, and this magnet 4 is press-fitted into the groove 3 provided in the first member 1, whereby the elastically deformable projections 12 and the groove 3 constitute in combination a supplementary seal.

It is also possible, according to this embodiment, to realize a complete sealing type magnetic liquid seal which enables the magnet 4 to be secured stably.

Figure 16:
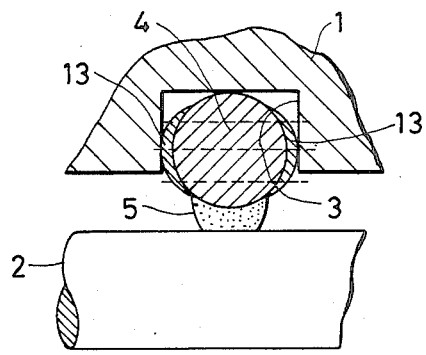

The embodiment shown in FIG. 16 is arranged such that an elastic material 13 such as rubber is bonded to each surface of the magnet 4 through which the magnetic flux extends, and this magnet 4 is press-fitted into the groove 3 provided in the first member 1. This arrangement also enables realization of a complete sealing type magnetic liquid seal having a supplementary seal provided between the magnet 4 and the first member 1. If each elastic material 13 is formed such as to have a rectangular cross-section, the magnet 4 can be stably secured in the groove 3 in such a manner that the magnet 4 has the same orientation at all times.

Figure 17:
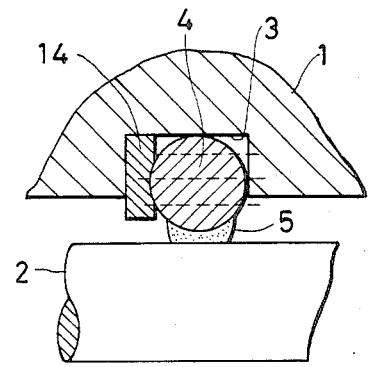

The embodiment shown in FIG. 17 employs an elastic material 14 which is a member separate from the magnet 4, the elastic material 14 being press-fitted into the area between the magnet 4 and one side surface of the groove 3. It is also possible, with this arrangement, to realize a supplementary seal and accomplish a magnetic liquid seal which is capable of completely sealing fine contaminative particles.

Figure 18:
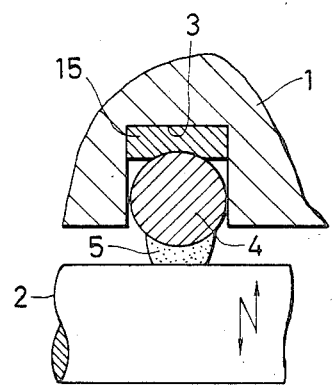

The embodiment shown in FIG. 18 has the same arrangement as that of the embodiment shown in FIG. 17 except that an elastic material 15 is disposed between the bottom surface of the annular groove 3 and the magnet 4. With this arrangement also, it is possible to realize a complete sealing type magnetic liquid seal. In addition, since when the amplitude of the shaft vibration is relatively large, the elastic material 15 is deformed in response to this vibration, it is possible to realize a magnetic liquid seal which is resistant against the shaft vibration.

Figure 19:
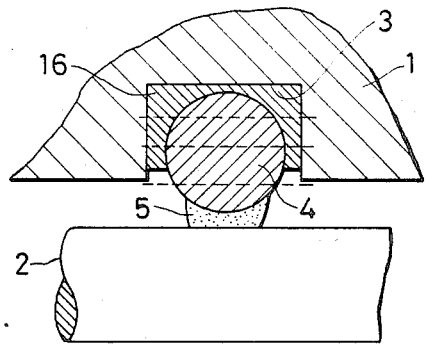

The embodiment shown in FIG. 19 employs a sealing material 16 such as a silicic adhesive which is interposed between the magnet 4 and the inner surface of the groove 3 provided in the first member 1. It is also possible, according to this embodiment, to realize a supplementary seal and obtain a complete sealing type magnetic liquid seal member.

As has been described above, according to the present invention, a magnet which applies a magnetic force to a magnetic liquid is constituted by a magnetized deformable magnetic member. Therefore, the magnet can be mounted easily and efficiently, so that it is possible to greatly improve the assembling efficiency.

In addition, if the present invention is applied to a device or machine installed in an environment which is required to have a high degree of cleanness, e.g., an articulate portion of a robot or a drive unit in a semiconductor manufacturing apparatus, the generation of contaminative particles from such device or machine is suppressed, so that it is possible to maintain the cleanness in the environment at a high level.

What is claimed is:

1. A magnetic liquid seal comprising:
    a first member having a groove provided at a surface thereof;
    a second member arranged for rotation with respect to said first member at least in the region of said groove;
    a deformable magnetized magnet being disposed in said groove; and
    a magnetic liquid being entrapped at a gap defined between said first and second member proximate to said deformable magnetized magnet;
    wherein said deformable magnet is magnetized so as to provide at least one pair of opposite polarity poles arranged so that an imaginary line intersecting said pair of poles extends in a direction substantially parallel to a surface of said second member, said deformable magnet providing a magnetic force for entrapping said magnetic liquid at said gap.

2. A magnetic liquid seal according to claim 1, wherein said deformable magnet is a rod-shaped member.

3. A magnetic liquid seal according to claim 1, wherein said deformable magnet is an annular ring-shaped member.

4. A magnetic liquid seal according to either one of claims 2 and 3, wherein said deformable magnet has two protuberances which are magnetized in such a manner that their distal ends serve as N- and S-poles, respectively.

5. A magnetic liquid seal according to either one of claims 2 and 3, wherein said deformable magnet has at least three protuberances which are magnetized in such a manner that the distal ends of the protuberances which are adjacent to each other serve as magnetic poles which are opposite in polarity to each other.

6. A magnetic liquid seal according to either one of claims 2 and 3, wherein said deformable magnet has a circular cross-section and is polarized so that at least said one pair of poles are formed on the surface thereof.

7. A magnetic liquid seal according to either one of claims 2 and 3, further comprising:
a magnet provided on the other of said two members so as to face said deformable magnet which is magnetized so that the opposing magnetic poles of these two magnets are opposite in polarity to each other.

8. A magnetic liquid seal according to claim 7, wherein said deformable magnet has at least one protuberance.

9. A magnetic liquid seal according to claim 1, further comprising
a supplementary seal provided between said groove and said magnet.

10. A magnetic liquid seal according to claim 9, wherein said supplementary seal is constituted by said magnet having a diameter larger than the width of said groove, said magnet being press-fitted into said groove.

11. A magnetic liquid seal according to claim 9, wherein said supplementary seal is constituted by an elastically deformable projection provided on said magnet, said projection being brought into pressure-contact with the inner wall surface of said groove.

12. A magnetic liquid seal according to claim 9, wherein said supplementary seal is constituted by an elastic material which is bonded to said magnet, said elastic member is brought into pressure-contact with the inner wall surface of said groove.

13. A magnetic liquid seal according to claim 9, wherein said supplementary seal is an elastic material which is press-fitted between said magnet and said groove.

14. A magnetic liquid seal according to claim 9, wherein said supplementary seal is an adhesive interposed between said magnet and said groove.

15. A magnetic liquid seal according to claim 1, wherein the imaginary line extends in a direction substantially parallel to an axis of said second member, and said deformable magnet provides a magnetic force for entrapping said magnetic liquid at said gap including a gap between said deformable magnet and said second member.

16. A magnetic liquid seal according to claim 1, wherein said deformable magnet has a circular cross-section and is magnetized so that at least a polarized direction of said at least one pair of poles is formed so that a magnetic flux extends in a direction substantially parallel to the surface of said second member, and said deformable magnet provides a magnetic force for entrapping said magnetic liquid at said gap including a gap portion between said deformable magnet and said second member.

17. A magnetic liquid seal according to claim 1, wherein said second member is a non-magnetic member, and said deformable magnet provides a magnetic force for entrapping said magnetic liquid at said gap including a gap portion between said deformable magnet and said second member.

18. A magnetic liquid seal according to claim 1, wherein said second member is a magnetic member, and said deformable magnet provides a magnetic force for entrapping said magnetic liquid at said gap including a gap portion between said deformable magnet and and said second member.

* * * * *